(12) United States Patent
Chen

(10) Patent No.: US 8,452,297 B2
(45) Date of Patent: May 28, 2013

(54) METHOD OF RANDOM ACCESS CHANNEL OPTIMIZATION AND RELATED COMMUNICATION DEVICE

(75) Inventor: Te-Ming Chen, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 344 days.

(21) Appl. No.: 12/825,307

(22) Filed: Jun. 28, 2010

(65) Prior Publication Data

US 2010/0331031 A1 Dec. 30, 2010

Related U.S. Application Data

(60) Provisional application No. 61/221,099, filed on Jun. 29, 2009.

(51) Int. Cl.
*H04W 72/00* (2009.01)

(52) U.S. Cl.
USPC .......... 455/450; 455/522; 455/69; 455/70; 455/451; 455/455

(58) Field of Classification Search
USPC .............. 455/522, 69–70, 450–455, 9, 515
See application file for complete search history.

(56) References Cited

U.S. PATENT DOCUMENTS

| | | | |
|---|---|---|---|
| 2005/0266846 A1* | 12/2005 | Kim | 455/436 |
| 2006/0084432 A1 | 4/2006 | Balasubramanian | |
| 2008/0232283 A1 | 9/2008 | Jen | |
| 2009/0143074 A1* | 6/2009 | Pelletier et al. | 455/452.2 |
| 2010/0323710 A1* | 12/2010 | Chen | 455/450 |
| 2011/0051609 A1* | 3/2011 | Ishii et al. | 370/252 |
| 2012/0008524 A1* | 1/2012 | Amirijoo et al. | 370/252 |

FOREIGN PATENT DOCUMENTS

| | | |
|---|---|---|
| EP | 1 411 738 A1 | 4/2004 |
| EP | 1 720 373 A1 | 11/2006 |
| EP | 1 973 365 A2 | 9/2008 |
| TW | 200917868 | 4/2009 |
| WO | 9715163 A1 | 4/1997 |
| WO | 2007049204 A1 | 5/2007 |
| WO | 2009022835 A2 | 2/2009 |
| WO | 2009023470 A2 | 2/2009 |

OTHER PUBLICATIONS

3GPP TR 36.902 V1.0.0 3rd Generation Partnership Project; Technical Specification Group TSG RAN Evolved Universal Terrestrial Radio Access Network (E-UTRAN); Self-configuring and self-optimizing network use cases and solutions (Release 8), Feb. 2008.
3GPP TS 36.321 V8.6.0 3rd Generation Partnership Project; Technical Specification Group Radio Access Network; Evolved Universal Terrestrial Radio Access (E-UTRA) Medium Access Control (MAC) protocol specification (Release 8), Jun. 2009.

(Continued)

*Primary Examiner* — Fayyaz Alam
(74) *Attorney, Agent, or Firm* — Winston Hsu; Scott Margo

(57) ABSTRACT

A method of random access channel (RACH) optimization for a mobile device in a wireless communication system is disclosed. The method comprises receiving a system information message for RACH configuration optimization, from a network of the wireless communication system, and determining whether to send a first RACH measurement report, used for the network to perform the RACH configuration optimization, to the network, according to existence of a field in the system information message.

19 Claims, 7 Drawing Sheets

OTHER PUBLICATIONS

3GPP TS 36.314 V8.2.0 3rd Generation Partnership Project; Technical Specification Group Radio Access Network; Evolved Universal Terrestrial Radio Access (E-UTRA); Layer 2—Measurements (Release 8), Jun. 2009.

Office action mailed on Feb. 17, 2013 for the China application No. 201010227160.1, filing date Jun. 29, 2010, p. 1-7, 15-16.

Ericsson, "Necessary UE Measurement Support for the Rach Optimization Function", 3GPP TSG RAN WG3 Meeting #64, R3-091154, May 4-8, 2009, San Francisco, USA, p. 1-7.

Office action mailed on Mar. 25, 2013 for the Taiwan application No. 099121388, filing date Jun. 29, 2010, p. 1-13.

\* cited by examiner

METHOD OF RANDOM ACCESS CHANNEL OPTIMIZATION AND RELATED COMMUNICATION DEVICE

CROSS REFERENCE TO RELATED APPLICATIONS

This application claims the benefit of U.S. Provisional Application No. 61/221,099, field on Jun. 29, 2009 and entitled "Method to handle RACH SON optimization" the contents of which are incorporated herein in their entirety.

BACKGROUND OF THE INVENTION

1. Field of the Invention

A method utilized in a wireless communication and related communication device are disclosed, and more particularly, to a method for random access channel optimization in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In LTE system, random access channel (RACH) is an uplink channel, and is used to transfer control information from a UE to the network, e.g. for initial access to set up a connection or for location area updates. It can also be used for the transport of user data packets. Since the RACH channel is a contention based channel where several users might access the same resource, the RACH configuration has critical impacts to system performance. For example, the RACH collision probability is significantly affected by the RACH configuration, thereby making this a critical factor for call setup delays, data resuming delays from the uplink unsynchronized state, and handover delays. In addition, the RACH configuration also affects the call setup success rate and handover success rate.

In order to improve the system performance, RACH optimization functionality is introduced in the LTE system. The network may perform the RACH optimization for optimizing the RACH configuration, thereby increasing efficiency as well as improving the system performance. In addition, a random access procedure is performed for collecting RACH parameters. The UE stores the collected RACH parameters after the random access procedure, and waits for the network to request for the collected RACH results for RACH optimization. Therefore, the network can perform the RACH optimization according to the collected RACH results.

However, how the network requests for the collected RACH results is not clearly specified, thereby affecting process of the RACH optimization. That is, how the UE reports the RACH results is never concerned. Moreover, the UE may not maintain the RACH results. Thus, when the network requests the UE to send the RACH results, the UE does not know how to deal with this situation. In other words, how the network shall handle the situation that the network requests for the RACH results but the UE does not have any of the RACH results is not clearly defined.

SUMMARY OF THE INVENTION

A method for random access channel optimization in a wireless communication system is disclosed to enhance random access chancel optimization.

A method of random access channel (RACH) optimization for a mobile device in a wireless communication system is disclosed. The method comprises receiving a system information message for RACH configuration optimization, from a network of the wireless communication system, and determining whether to send a first RACH measurement report, used for the network to perform the RACH configuration optimization, to the network, according to existence of a field in the system information message.

A method of random access channel (RACH) optimization for a mobile device in a wireless communication system is disclosed. The method comprises receiving a message for RACH configuration optimization, from a network of the wireless communication system, and sending a RACH measurement report including no measurement result to the network in response to the message, when the mobile device does not have any measurement result.

A method of handling random access channel (RACH) optimization for a base station in a wireless communication system is disclosed. The method comprises sending a first message for RACH configuration optimization to a first mobile device of the wireless communication system, and after a RACH measurement report corresponding to the first message is received, requesting the first mobile device to perform a random access procedure for collecting RACH measurement results, wherein the received RACH measurement report includes no RACH measurement result.

A method of random access channel (RACH) optimization for a mobile device in a wireless communication system is disclosed. The method comprises receiving a message for RACH configuration optimization, from a network of the wireless communication system, and ignoring the message for RACH configuration optimization when the mobile device has no RACH measurement result.

A method of random access channel (RACH) optimization for a mobile device in a wireless communication system is disclosed. The method comprises receiving a first message for RACH configuration optimization, from a network of the wireless communication system, and performing a random access procedure for collecting the RACH measurement results when the mobile device has no RACH measurement result after the step of receiving the first message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
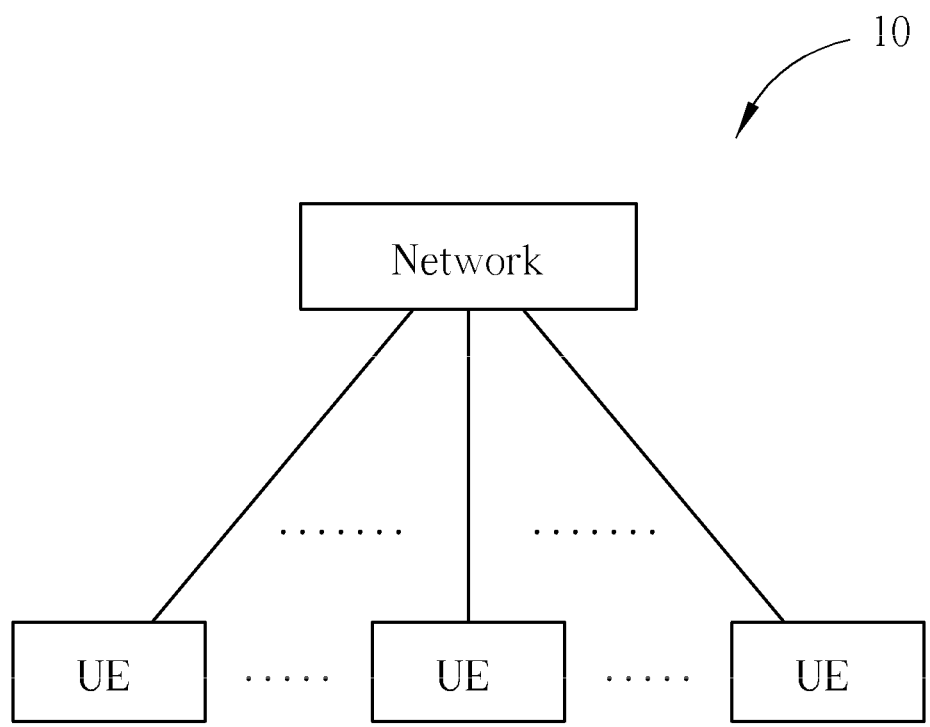
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of mobile devices. The wireless communication system 10 can be a UMTS (Universal Mobile Telecommunications System), an LTE (long-term evolution) system or any other similar network system. In the LTE system, the network can be referred as a EUTRAN (evolved-UTRAN) comprising a plurality of eNBs or a core network entity (e.g. Mobility Management Entity called MME), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
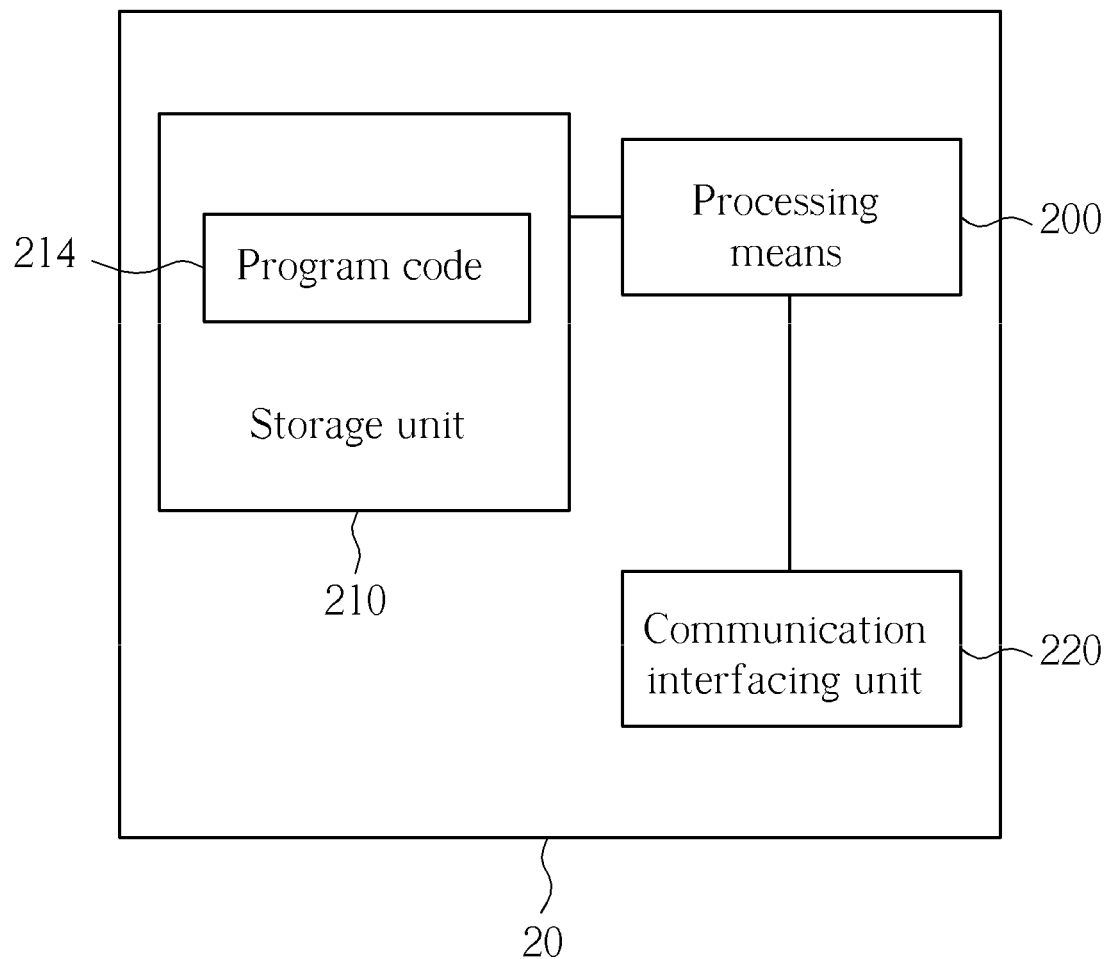
FIG. 2 illustrates a schematic diagram of an exemplary communication device.

FIG. 2 illustrates a schematic diagram of an exemplary communication device 20. The communication device 20 can be the mobile device or the network (e.g. a base station) shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROM, magnetic tape, hard disk, and optical data storage device. The communication interfacing unit 220 is preferably a radio transceiver and can exchange wireless signals with the network according to processing results of the processing means 200.

The program code 214 includes program code of a Medium Access Control (MAC) layer and program code of a radio resource control (RRC) layer. The program code of the MAC layer can manage a random access procedure for collecting random access channel (RACH) parameters. In addition, the program code of the RRC layer is used for RRC connection management, measurement reporting and control, and radio bearer (RB) control responsible for generating or releasing radio bearers (RBs). The RRC layer obtains the collected RACH parameters from the MAC layer, and then generates a RACH measurement report based on the collected RACH measurement results. After that, the RACH measurement report is sent to the network (e.g. E-UTRAN).

Figure 3:
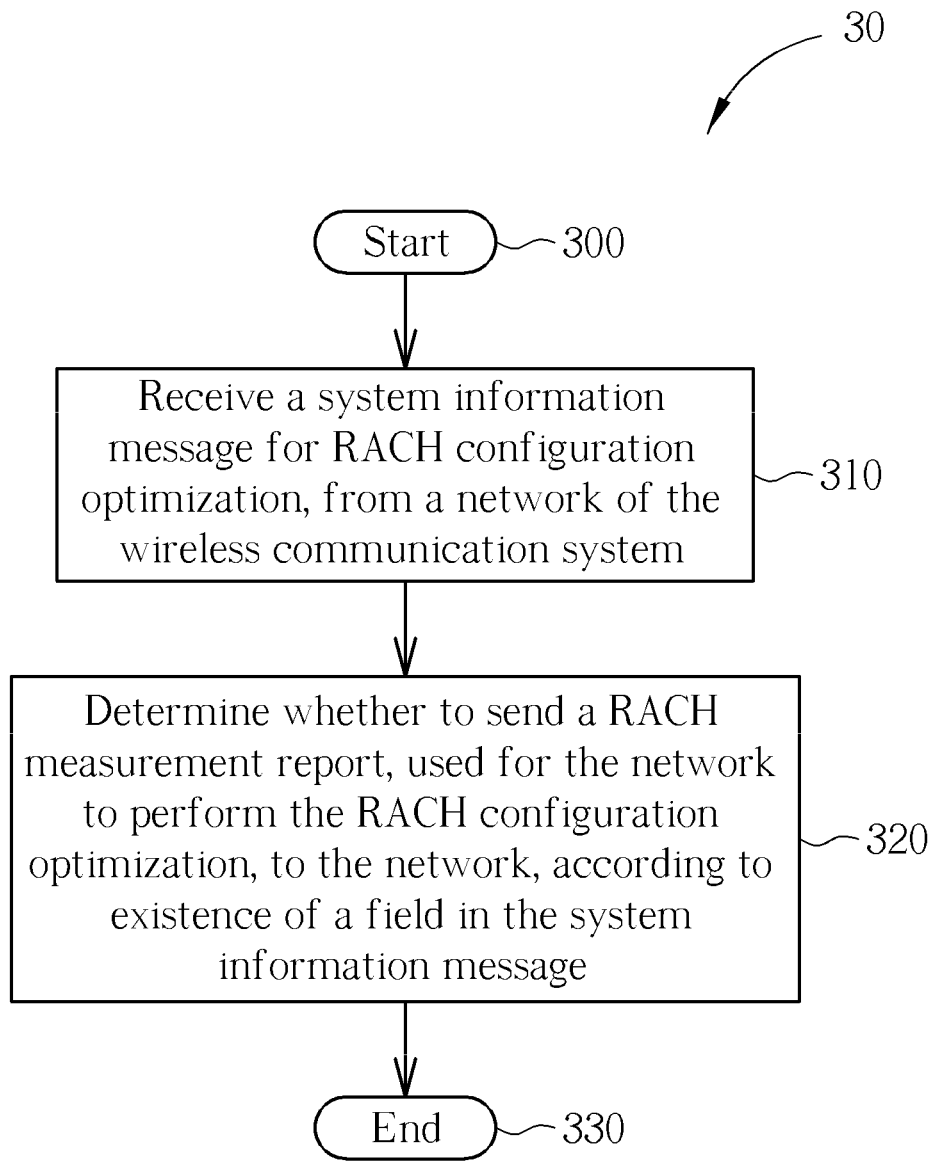
FIG. 3-7 are flowcharts of exemplary processes according to the present disclosure.

Please refer to FIG. 3, which illustrates a flowchart of an exemplary process 30. The process 30 is utilized in a UE for random access channel optimization, where the UE can be the communication device 20 of FIG. 2. The process 30 may be compiled into the program code 214 and includes the following steps:

Step 300: Start.

Step 310: Receive a system information message for RACH configuration optimization, from a network of the wireless communication system.

Step 320: Determine whether to send a RACH measurement report, used for the network to perform the RACH configuration optimization, to the network, according to existence of a field in the system information message.

Step 330: End.

According to the process 30, the network request the UE to report the RACH measurement report for RACH configuration optimization by sending the system information message, whereas the UE determines whether to send the RACH measurement report, used for the network to perform the RACH configuration optimization, to the network according to the field in the system information message. The RACH measurement report includes RACH measurement results collected via a random access procedure performed by the UE, and the RACH measurement results are stored in the UE after the random access procedure. Therefore, the UE deletes the RACH measurement results when the UE finds that the field is not included in the system information message, and sends the RACH measurement report including the RACH measurement results to the network for the network to perform the RACH configuration optimization when the UE finds that the field is included in the system information message. Moreover, the UE may delete the RACH measurement results of the RACH measurement report after sending the RACH measurement report to the network.

In this embodiment, the RACH measurement results may include the parameter used to indicate the number of preambles of random access procedures that were transmitted to the network, and the parameter used to indicate whether contention is detected for at least one of the transmitted preambles.

Besides, the UE may determine whether to send the RACH measurement report to the network according to content of the field when the field exists in the system information message. For example, the content of the field may include a constant. The UE sends the RACH measurement report to the network after a number of times that the UE performs the random access procedure related to the RACH measurement report amounts to the constant indicated by the content of the field. Please note that, the measurement results in the RACH measurement report are collected via the random access procedures. The measurement results are then averaged. Moreover, the UE may delete the averaged measurement results after sending the RACH measurement report to the network.

Please note that, the abovementioned random access procedures may be performed by the UE based on different types of preambles, such as dedicated preambles, randomly selected preambles in the low range, and randomly selected preambles in the high range, which have been defined in TS 36.314. The definitions of these preambles shall be well-known in the art, so it is not given herein.

Taking another example, the content of the field may include an indicator (e.g. a 1 bit indicator). Therefore, the UE determines whether to send the RACH measurement report to the network according to the indicator of the field. The UE sends the RACH measurement report to the network when the indicator is set to a first value (e.g. set to 1), and does not send the RACH measurement report to the network when the indicator is set to a second value (e.g. set to 0). Moreover, the UE may delete the measurement results after sending the RACH measurement report to the network or after skipping sending the RACH measurement report to the network.

Alternatively, the content of the field may include a plurality of indicators each corresponding to a type of RACH measurement report. The types of the RACH measurement report may include a RACH measurement report corresponding to a dedicated preamble, and a RACH measurement report corresponding to a randomly selected preamble based on the different types of preambles used in the random access procedure. Assume that the field includes three indicators L1, L2, and L3, which indicate a RACH measurement report corresponding to a dedicated preamble, a RACH measurement report corresponding to a randomly selected preamble in the low range, and a RACH measurement report corresponding to a randomly selected preamble in the high range, respectively. Therefore, the UE sends the RACH measurement report corresponding to a dedicated preamble to the network when the indicator L1 is set to 'True', sends the RACH measurement report corresponding to a randomly selected preamble in the low range to the network when the indicator L2 is set to 'True', and so on. After sending the RACH measurement report to the network, the UE deletes the RACH measurement results of the RACH measurement report. On the other hand, the UE does not send the RACH measurement report to the network when the indicator L1, L2, and L3 are all set to 'False', and then deletes the measurement results.

Figure 4:
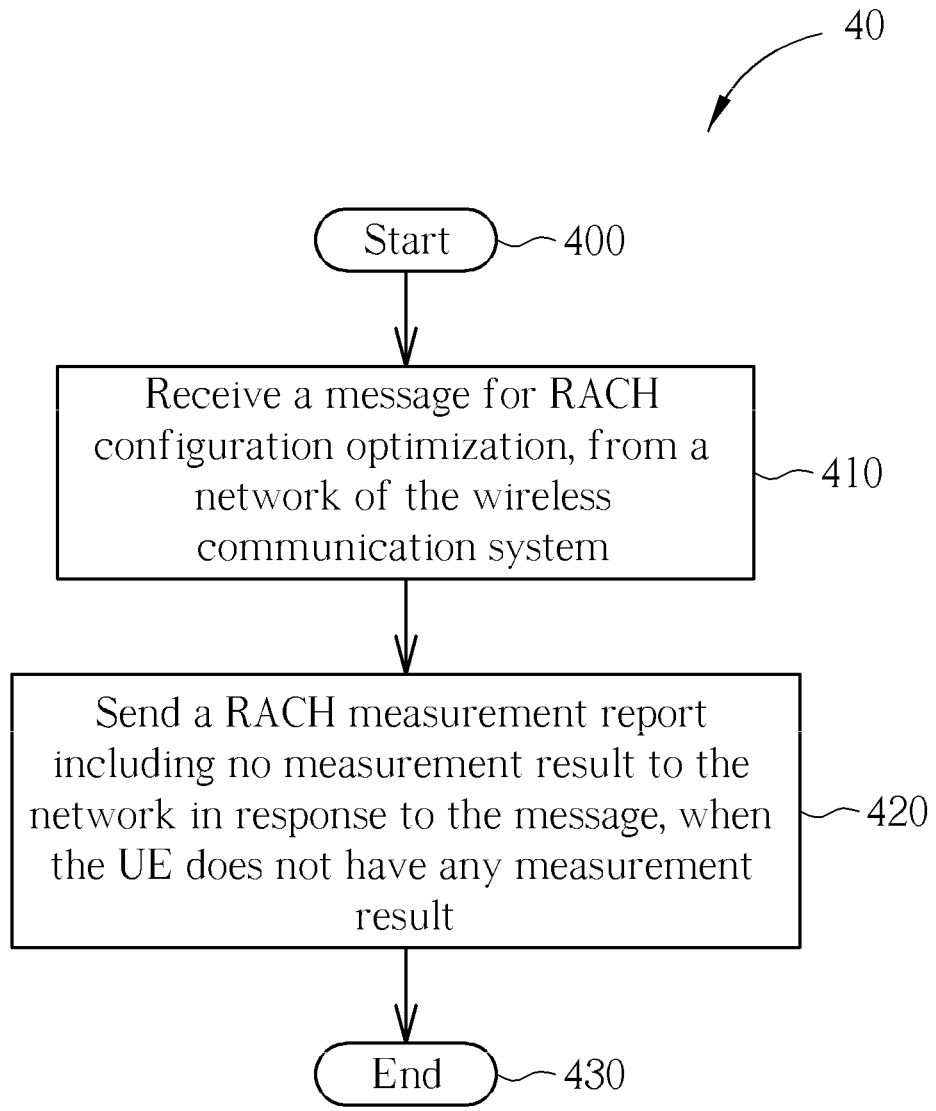

Please refer to FIG. 4, which illustrates a flowchart of an exemplary process 40. The process 40 is utilized in a UE for random access channel optimization, where the UE can be the communication device 20 of FIG. 2. The process 40 may be compiled into the program code 214 and includes the following steps:

Step 400: Start.

Step 410: Receive a message for RACH configuration optimization, from a network of the wireless communication system.

Step 420: Send a RACH measurement report including no measurement result to the network in response to the message when the UE does not have any measurement result.

Step 430: End.

According to the process 40, the UE sends a specific RACH measurement report to the network in the situation that the network requests the UE to report the RACH measurement report but the UE does have the RACH measurement results stored in. The specific RACH measurement report may only include a message body, or is filled with all zeros in the message body. Moreover, the RACH measurement report may include an indicator for indicating to the network that the UE has no measurement result, so that the network can know that the RACH measurement report is not a normal RACH measurement report (a normal RACH measurement report always includes measurement results).

Figure 5:
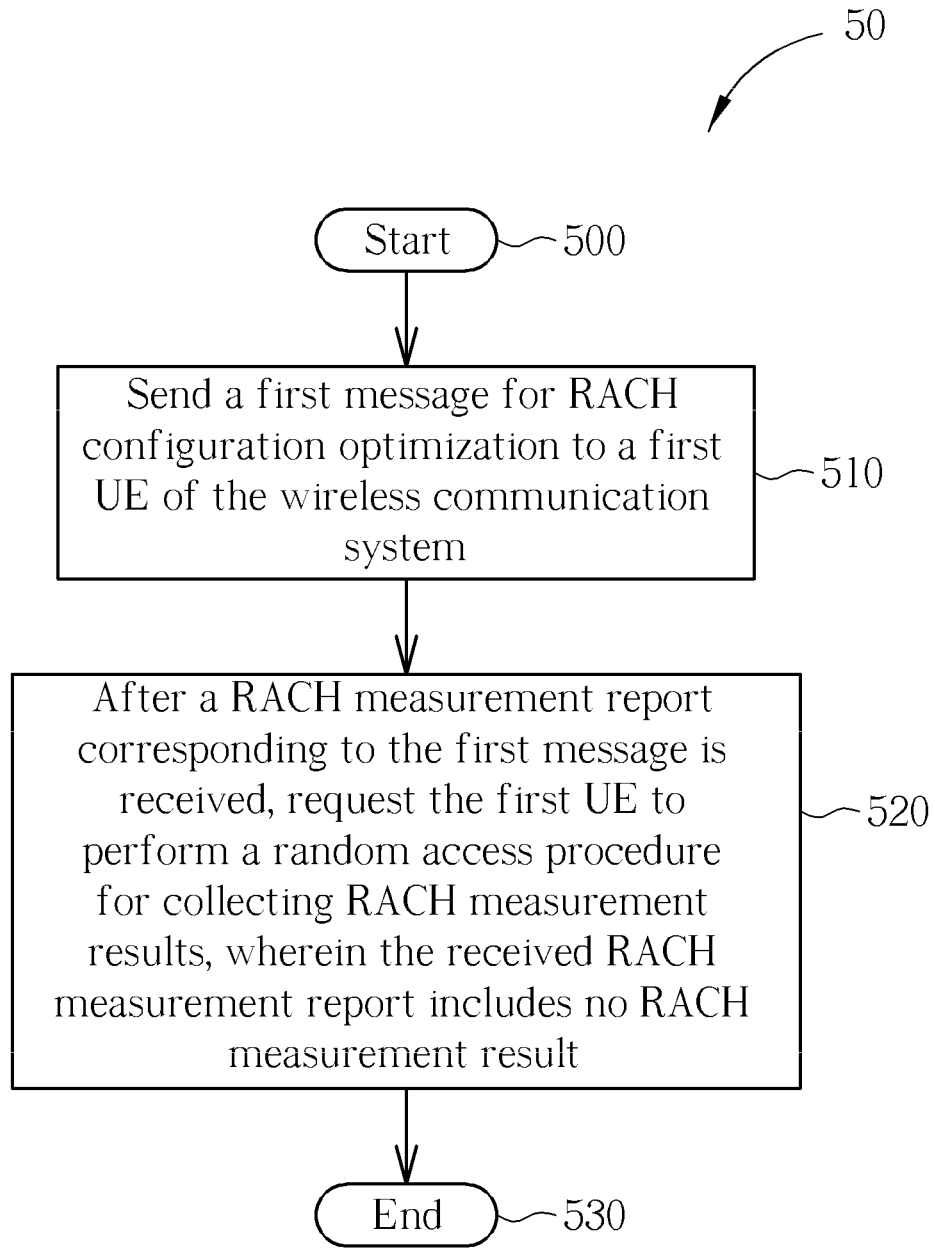

Please refer to FIG. 5, which illustrates a flowchart of an exemplary process 50. The process 50 is utilized in a network for random access channel optimization, where the network (e.g. a base station) can be the communication device 20 of FIG. 2. The process 50 may be compiled into the program code 214 and includes the following steps:

Step 500: Start.

Step 510: Send a first message for RACH configuration optimization to a first UE of the wireless communication system.

Step 520: After a RACH measurement report corresponding to the first message is received, request the first UE to perform a random access procedure for collecting RACH measurement results, wherein the received RACH measurement report includes no RACH measurement result.

Step 530: End.

According to the process 50, the network sends the first message to request the first UE to report the RACH measurement report, and then requests the first UE to perform the random access procedure for collecting the RACH measurement results when the received RACH measurement report includes no RACH measurement result. Moreover, the network may request a second UE to perform the random access procedure for collecting the RACH measurement results after the RACH measurement report including no measurement result is received from first UE. Therefore, the network can perform the RACH configuration optimization according to the RACH measurement results collected by the second UE.

Alternatively, the network may initiate a timer after sending the first message for the RACH configuration optimization to the first UE, and sends a second message for the RACH configuration optimization to the second UE after the timer is expired. Thus, the network can make use of the RACH measurement report from the second UE for the RACH configuration optimization. On the other hand, the network may request the first UE to perform the random access procedure for collecting the RACH measurement results after the timer is expired. Thus, the network can perform the RACH configuration optimization according to the RACH measurement results collected by the first UE.

Figure 6:
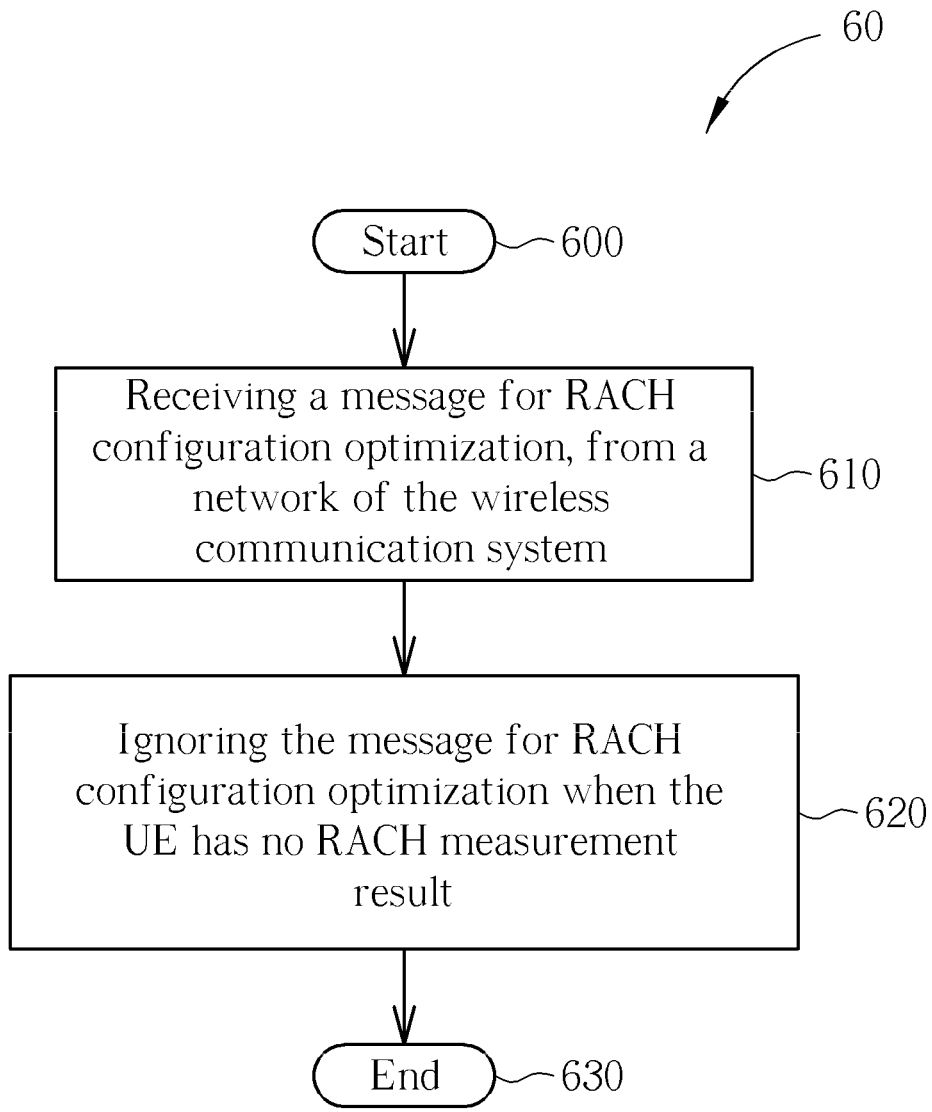

Please refer to FIG. 6, which illustrates a flowchart of an exemplary process 60. The process 60 is utilized in a UE for random access channel optimization, where the UE can be the communication device 20 of FIG. 2. The process 60 may be compiled into the program code 214 and includes the following steps:

Step 600: Start.

Step 610: Receive a message for RACH configuration optimization, from a network of the wireless communication system.

Step 620: Ignore the message for RACH configuration optimization when the UE has no RACH measurement result.

Step 630: End.

According to the process 60, the UE without RACH measurement results ignores the message for RACH configuration optimization from the network. That is, the UE does not send the RACH measurement report to the network. Please note that, the network may initiate a timer after sending the message for the RACH configuration optimization to the UE, and requests the UE or other UEs to perform the random access procedure after the timer expires. The detailed description can be referred from the above, so it is not given herein.

Figure 7:
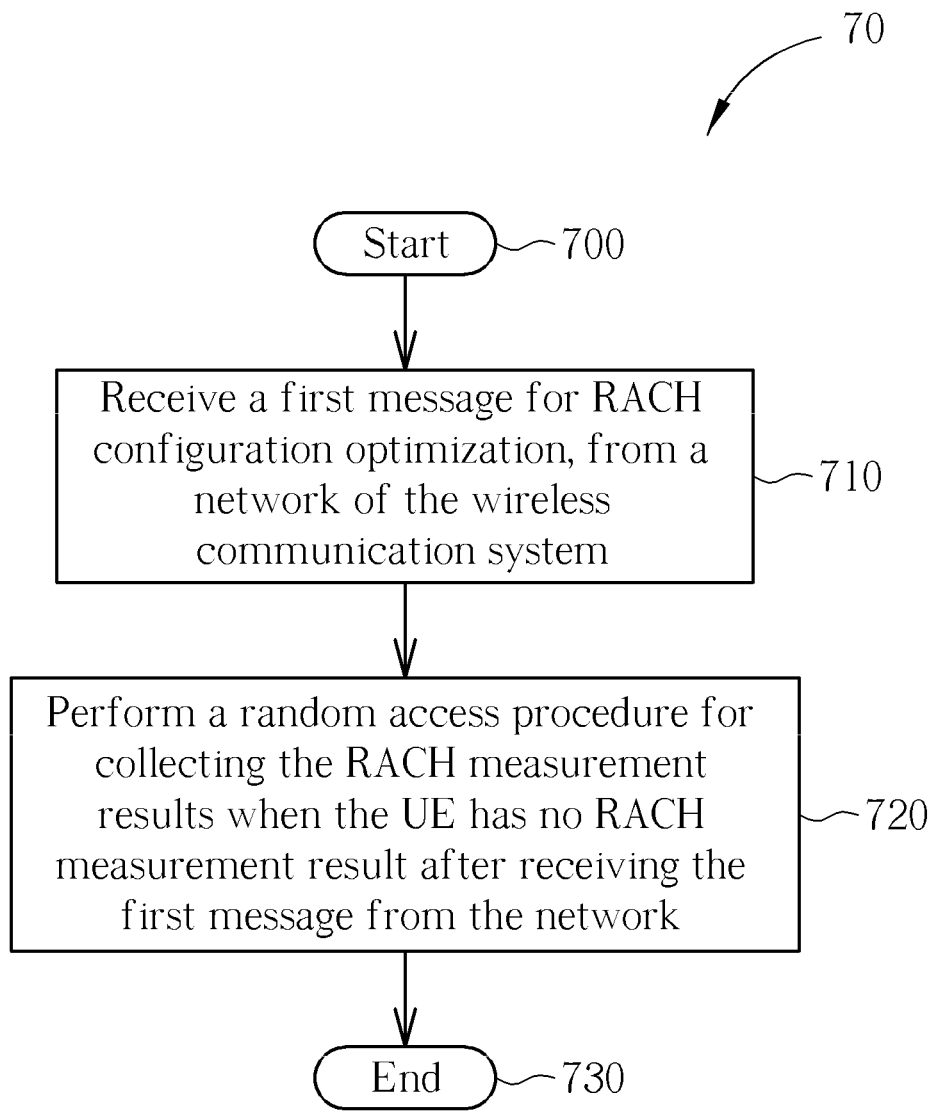

Please refer to FIG. 7, which illustrates a flowchart of an exemplary process 70. The process 70 is utilized in a UE for random access channel optimization, where the UE can be the communication device 20 of FIG. 2. The process 70 may be compiled into the program code 214 and includes the following steps:

Step 700: Start.

Step 710: Receive a first message for RACH configuration optimization, from a network of the wireless communication system.

Step 720: Perform a random access procedure for collecting the RACH measurement results when the UE has no RACH measurement result after receiving the first message from the network.

Step 730: End.

According to the process 70, the UE without RACH measurement results automatically performs the random access procedure for collecting the RACH measurement results after receiving the first message for the RACH configuration optimization from the network. The random access procedure may be performed based on the random selected preamble in the low range or in high range. In this situation, the UE may include the collected RACH measurement results in a message 3 of the random access procedure to the network. Alternatively, the UE may generate a second message including the collected RACH measurement results, and sends the second message to the network after the random access procedure is completed.

Based on the process 70, the network has no need to send another message to request the UE to collect the RACH measurement results or send another message for RACH configuration optimization to the UE. The UE automatically performs the random access procedure to collect the RACH measurement results, thereby increasing RACH optimization efficiency, and decreasing the signaling quality from the network.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary method and means are provided to enhance the RACH optimization. The network can request the UE to report required information for the RACH optimization via the system information message. In addition, the examples provide ways to deal with the situation that the UE is unable to provide the required information for the RACH optimization to the network, and thereby the network can perform the RACH optimization as scheme.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of random access channel (RACH) optimization for a mobile device in a wireless communication system, the method comprising:
   receiving a system information message for RACH configuration optimization, from a network of the wireless communication system; and
   determining whether to send a first RACH measurement report, used for the network to perform the RACH configuration optimization, to the network, according to existence of a field in the system information message.

2. The method of claim 1, wherein determining whether to send the first RACH measurement report to the network according to the existence of the field of the system information message comprises:
   when the field does not exist in the system information message, deleting RACH measurement results; and
   when the field exists in the system information message, sending the first RACH measurement report including the RACH measurement results to the network.

3. The method of claim 2, further comprising:
   deleting RACH measurement results after the step of sending the first RACH measurement report to the network.

4. The method of claim 1, wherein determining whether to send the first RACH measurement report to the network according to the existence of the field in the system information message comprises:
   when the field exists in the system information message, determining whether to send the first RACH measurement report to the network according to content of the field.

5. The method of claim 4, wherein when the field exists in the system information message, determining whether to send the first RACH measurement report to the network according to the content of the field comprises:
   sending the first RACH measurement report to the network after a number of times that the mobile device performs random access procedure related to the first RACH measurement report amounts to a constant indicated by the content of the field.

6. The method of claim 5, wherein sending the first RACH measurement report to the network after the number of times that the mobile device performs the random access procedure amounts to the constant indicated by the content of the field comprises:
   performing the random access procedures after a transmission of a second RACH measurement report precedent to the first RACH measurement report;
   averaging measurement results which are collected via the performed random access procedures;
   including the averaged measurement results in the first RACH measurement report; and
   sending the first RACH measurement report to the network.

7. The method of claim 4, wherein when the field exists in the system information message, determining whether to send the first RACH measurement report to the network according to the content of the field comprises:
   when an indicator of the field is set to a first value, sending the first RACH measurement report to the network; and
   when the indicator is set to a second value, skipping sending the first RACH measurement report to the network.

8. The method of claim 4, wherein when the field exists in the system information message, determining whether to send the first RACH measurement report to the network according to the content of the field comprises:
   when a first indicator of the field is set to a first value, sending the first RACH measurement report, which is a first report type, to the network; and
   when a second indicator of the field is set to the first value, sending the first RACH measurement report, which is a second report type, to the network.

9. The method of claim 8, wherein the first report type is a dedicated preamble RACH measurement report type, and the second report type is a randomly selected preamble RACH measurement report type.

10. The method of claim 8, further comprising
    when the first indicator and the second indicator of the field are set to a second value, skipping sending the first RACH measurement report to the network, and then deleting the measurement results.

11. A method of random access channel (RACH) optimization for a mobile device in a wireless communication system, the method comprising:
    receiving a message for RACH configuration optimization, from a network of the wireless communication system; and
    sending a RACH measurement report including no measurement result to the network in response to the message, when the mobile device does not have any measurement result.

12. The method of claim 11, wherein the RACH measurement report includes an indicator for indicating to the network that the mobile device has no measurement result.

13. A method of handling random access channel (RACH) optimization for a base station in a wireless communication system, the method comprising:
    sending a first message for RACH configuration optimization to a first mobile device of the wireless communication system; and
    requesting the first mobile device to perform a random access procedure for collecting RACH measurement results after a RACH measurement report corresponding to the first message and including no RACH measurement result is received.

14. The method of claim 13, further comprising:
    requesting a second mobile device of the wireless communication system to perform the random access procedure for collecting the RACH measurement results after the RACH measurement report including no measurement result is received from the first mobile device.

15. The method of claim 13, further comprising:

initiating a timer after the step of sending the first message for RACH configuration optimization to the first mobile device; and sending a second message for RACH configuration optimization to a second mobile device of the wireless communication system after the timer is expired.

16. The method of claim 13, further comprising:

initiating a timer after the step of sending the first message for RACH configuration optimization to the first mobile device; and requesting the first mobile device to perform the random access procedure for collecting the RACH measurement results after the timer is expired.

17. A method of random access channel (RACH) optimization for a mobile device in a wireless communication system, the method comprising:

receiving a message for RACH configuration optimization, from a network of the wireless communication system; and ignoring the message for RACH configuration optimization when the mobile device has no RACH measurement result.

18. A method of random access channel (RACH) optimization for a mobile device in a wireless communication system, the method comprising:

receiving a first message for RACH configuration optimization, from a network of the wireless communication system; and performing a random access procedure for collecting the RACH measurement results when the mobile device has no RACH measurement result after the step of receiving the first message.

19. The method of claim 18, further comprising:

generating a second message including the collected RACH measurement results; and sending the second message to the network.

\* \* \* \* \*